United States Patent [19]
Westall et al.

[11] 3,821,417
[45] June 28, 1974

[54] FLAVOR PRESERVATION IN CHEWING GUM COMPOSITIONS AND CANDY PRODUCTS

[75] Inventors: Edward B. Westall, San Jacinto, Calif.; James J. Scanlan, Hilladale, N.J.; Miroslaw Sahaydak, Great Neck, N.Y.

[73] Assignee: Warner-Lambert Company, Morris Plains, N.Y. ; by said Scanlon and Sahaydak

[22] Filed: Oct. 14, 1971

[21] Appl. No.: 189,374

Related U.S. Application Data

[63] Continuation-in-part of Ser. No. 88,144, Nov. 9, 1970, abandoned.

[52] U.S. Cl. .................................................. 426/3
[51] Int. Cl. .......................... A23g 3/00, A23g 3/30
[58] Field of Search .......................... 99/135, 141 A

[56] References Cited
UNITED STATES PATENTS 3,087,821  4/1963  Horowitz et al. ................ 99/141 A
3,522,236  7/1970  Krbechek et al. ................ 99/141 A

*Primary Examiner*—A. Louis Monacell
*Assistant Examiner*—J. M. Hunter
*Attorney, Agent, or Firm*—Albert H. Graddis; Frank S. Chow; Anne M. Kelly

[57] ABSTRACT

A dihydrochalcone compound or a mixture of dihydrochalcone compounds and salts thereof, added at concentrations of at least 0.0025 percent by weight, based on the weight of the total formulation, have been found to modify deterioration of essential oil flavors in chewing gum compositions and candy products. in addition, these dihydrochalcone preservatives prolong flavor qualities during the chewing of gum compositions. Neohesperidin and naringin dihydrochalcones and mixtures thereof have been found to be particularly effective in the preservation of oil of peppermint flavor.

40 Claims, No Drawings

FLAVOR PRESERVATION IN CHEWING GUM COMPOSITIONS AND CANDY PRODUCTS

CROSS REFERENCE TO RELATED APPLICATION

This application is a continuation-in-part of our copending application, U.S. Ser. No. 88,144, filed Nov. 9, 1970, now abandoned.

BACKGROUND OF THE INVENTION

Cold pressed and concentrated essential oils, widely used as flavoring materials, are subject to flavor deterioration resulting from the action of heat, light, air and moisture. These essential oil flavors are known to oxidize when stored in the presence of air and moisture. During this deterioration process, terpene compounds, which have very unpleasant odors and tastes, are formed and the oxidized oils are therefore no longer satisfactory for use in flavoring.

Similar hazards are encountered when products formulated to contain essential oil flavors are manufactured, shipped, and stored. Even though every effort is made to guard against deterioration of flavor oils during the manufacture and shipping of products containing these oils, once the products are marketed and in the hands of the consumer, little can be done to prevent the development of off-flavors.

In addition to the above mentioned deterioration problems, conventional chewing gum compositions are also subject to dissipation of flavor before the end of the "chewing" life normally associated with the gum. Thus, while gum compositions are usually considered "chewable" for hours, the flavor is often dissipated in a considerably shorter period, for example, in a period of from about 3 to 5 minutes. Obviously, depending upon the particular gum formulation and the flavors in use, variations in the time that the flavor endures, while the gum is being chewed, will occur. In general, however, no formulation and/or flavor is known which maintains fully a distinctive taste characteristic in the oral cavity during the useful life of a chewing gum.

Many methods have been devised in the past to improve the flavor quality of gum compositions and candy products. Attempts have been made to prevent deterioration of flavor, as in U.S. Pat. No. 2,891,868, by using enzyme deoxygenators, such as glucose oxidase with a glucose substrate and catalase, to maintain flavor quality in chewing gum. U.S. Pat. No. 3,205,075 teaches the protection of sensitive flavors by coating them with a sugar shell prior to incorporation into chewing gum; more than one flavor can be treated in this manner to provide a multiflavor slab chewing gum in which the flavor ingredient is not only protected but released into the oral cavity in a controlled manner.

Other methods for preventing deterioration of flavor oils involve the addition of antioxidants to the formulated product. For example, in U.S. Pat. No. 2,869,895 and in U.S. Pat. No. 3,041,180, the formulation of a solid particulate emulsion containing a flavor oil and an antioxidant provides both flavor protection and controlled release when added to dehydrated beverage products.

In addition, a series of patents, U.S. Pat. No. 2,886,442 — U.S. Pat. No. 2,886,445, and U.S. Pat. No. 2,886,447 — U.S. Pat. No. 2,886,449, teach the encapsulation of volatile, water-immiscible flavoring oils in a gelatin material to provide the controlled release of flavor in gum products.

While these and other similar prior art methods for preserving and prolonging flavor qualities in chewing gum compositions and other candy products have been relatively effective, such methods do require special manufacturing techniques and procedures, and are therefore unattractive. Thus, an effective method for preserving and prolonging flavor in chewing gum and candy products containing essential oil flavoring materials, which does not entail extensive revision of usual manufacturing facilities, has not yet been developed.

SUMMARY OF THE INVENTION

Flavor quality in conventional chewing gum or candy products containing essential oil flavoring materials is preserved and prolonged by the addition of 0.0025 to 0.5 percent by weight, based on the weight of the total formulation, of at least one dihydrochalcone preservative of the type herein described. Products containing a dihydrochalcone preservative can be stored for extended periods of time without usual adverse effects of flavor deterioration.

DESCRIPTION OF THE INVENTION

In carrying out the present invention, dihydrochalcone preservatives having the formula I below:

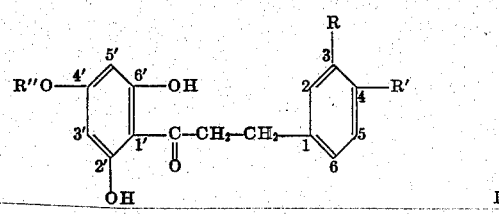

wherein R represents a radical selected from the group consisting of hydrogen and hydroxy; R' represents a radical selected from the group consisting of hydrogen, hydroxy, and 1 to 3 carbon alkoxy; and R'' represents a glycoside residue selected from the group $\beta$-rutinosyl, neohesperidosyl, and $\beta$-D-glucosyl; and the non-toxic, monosalts thereof, are added to chewing gum and candy compositions containing essential oil flavoring materials to preserve flavor quality for extended periods of time.

In the above formula I, the R'' substituents, $\beta$-rutinosyl, $\beta$-neohesperidosyl and $\beta$-D-glucosyl have the following structures:

$\beta$-Rutinosyl (II) which may also be named as 6-O-$\alpha$-L-rhamnosyl-$\beta$-D-glucosyl:

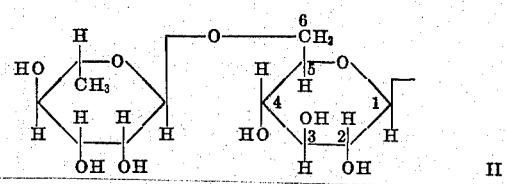

$\beta$-Neohesperidosyl (III): which may also be named as 2-O-$\alpha$-L-rhamosyl-$\beta$-D-glucosyl:

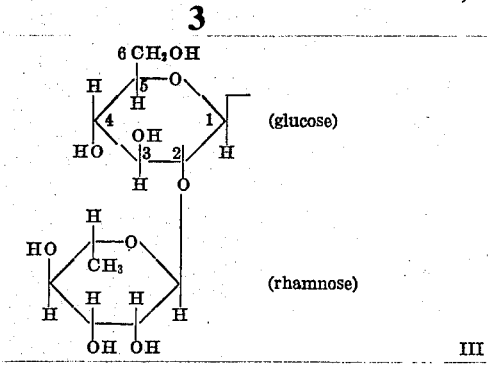

β-D-glucosyl (IV):

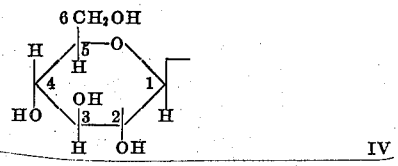

Substituents in Formula I above which characterize representative dihydrochalcones of the invention are as follows:

Neohesperidin dihydrochalcone or 2',3,6'-trihydroxy-4-methoxy-4'-neohesperidosyloxydihydrochalcone:
  R = hydroxy at the 3 position
  R' = methoxy at the 4 position
  R" = neohesperidosyl radical at the 4' position 2',3,6'-trihydroxy-4-ethoxy-4'-neohesperidosyloxydihydrochalcone:
  R = hydroxy at the 3 position
  R' = ethoxy at the 4 position
  R" = neohesperidosyl radical at the 4'-position 2',3,6'-trihydroxy-4-propoxy-4'-neohesperidosyloxydihydrochalcone:
  R = hydroxy at the 3 position
  R' = propoxy at the 4 position
  R" = neohesperidosyl radical at the 4'-position 2',3,6'-trihydroxy-4'-neohesperidosyloxydihydrochalcone:
  R = hydroxy at the 3 position
  R' = hydrogen at the 4 position
  R" = neohesperidosyl radical at the 4' position Naringin dihydrochalcone or 2',4,6'-trihydroxy-4'-neohesperidosyloxydihydrochalcone:
  R = hydrogen at the 3 position
  R' = hydroxy at the 4 position
  R" = neohesperidosyl radical at the 4' position Eriodictyol 7-neohesperidoside dihydrochalcone or 2',3,4,6'-tetrahydroxy-4'-neohesperidosyloxydihydrochalcone:
  R = hydroxy at the 3 position
  R' = hydroxy at the 4 position
  R" = neohesperidosyl at the 4' position Homoeriodictyol 7-neohesperidoside dihydrochalcone or 2',4,6'-trihydroxy-3-methoxy-4'-neohesperidosyloxydihydrochalcone:
  R = methoxy at the 3 position
  R' = hydroxy at the 4 position
  R" = neohesperidosyl dihydrochalcone at the 4' position Prunin dihydrochalcone or 2',4,6'-trihydroxy-4'-β-D-glucosyloxydihydrochalcone:
  R = hydrogen at the 3 position
  R' = hydroxy at the 4 position
  R" = β-D-glucosyl radical at the 4' position Hesperetin Dihydrochalcone Glucoside or 2',3,6'-trihydroxy-4-methoxy-4'-β-D-glucosyloxydihydrochalcone:
  R = hydroxy at the 3 position
  R' = methoxy at the 4 position
  R" = β-D-glucosyl radical at the 4' position Hesperidin Dihydrochalcone or 2',3,6'-trihydroxy-4-methoxy-4'-β-rutinosyloxydihydrochalcone:
  R = hydroxy at the 3-position
  R' = methoxy at the 4-position
  R" = β-rutinosyl at the 4' position Dihydrochalcone compounds of this nature, and the method for their preparation are disclosed in U.S. Pat. No. 3,087,821. In general, the compounds are prepared from the corresponding flavanone glycosides by known methods, involving, for example, the conversion of the flavanone glycosides to the corresponding chalcone, followed by the reduction of this intermediate to the dihydrochalcone. In particular, hesperetin dihydrochalcone gluoside may be prepared from hesperidin according to the process described in U.S. Pat. No. 3,583,894.

Additionally, in J. Agr. Food Chem. 16: 108–112 (1968), Krbechek et al., describe the preparation of a variety pf dihydrochalcones from naringin: naringin is converted into phloracetaphenone 4'-β-neohesperidoside, which is then reacted with approrpriate benzaldehydes to yield a series of chalcones; these are either hydrogenated to the dihydrochalcones or cyclized to the corresponding flavones, which are, in turn, converted to their respective dihydrochalcones. Proper reaction conditions provide good yields of dihydrochalcones in relatively short periods of time.

In U.S. Pat. No. 3,522,236, the 2',4',6',3-tetrahydroxy-4-n-propoxydihydrochalcone 4'-β-neohesperidoside (also named as 2',3,6'-trihydroxy-4-propoxy-4'-neohesperidosyloxydihydrochalcone) is described as being a water soluble compound of intense sweetness suitable for providing low caloric sweetening to edible materials including fruits, vegetables, meats, cereals, beverages, pastries, candies, desserts, chewing gums, toothpastes, mouth rinses, tobacco products and the like.

Nontoxic, mono-salts of dihydrochalcone compounds of formula I above are also suitable for use in prolonging and preserving flavors in chewing gum compositions and candy products according to the practice of this invention. Among those salts which are suitable there may be mentioned sodium, potassium, calcium and ammonium salts; of these the calcium salt is particularly preferred. The mono-salts of dihydrochalcone compounds and their preparation are described and claimed in co-pending application, U.S. Ser. No. 143,632, filed May 14, 1971. According to the general method of preparation, an alkali metal or an alkaline earth metal hydroxide, oxide or salt is reacted with the desired dihydrochalcone in an aqueous medium in a molar ration of 1 mole of alkali metal compound to 1 mole of the dihydrochalcone; in the case of the alkaline earth metal compounds, 0.5 mole of alkaline earth metal to 1 mole of dihydrochalcone compound is used. For the alkali metal reactants, the hydroxide is preferably employed; however, since alkaline earth metals are less soluble, the hydroxide may be introduced in the form of an aqueous suspension. The dihydrochalcone salt reaction product obtained has only one of the three free phenolic hydroxyl groups of the original dihydrochalcone compound reacted in the salt formation. The mono-salt derivatives formed are characterized in general by a higher degree of solubility than the free bases from which they are formed.

Among the dihydrochalcone derivatives, those having the following configuration have been found to be particularly effective in preserving and prolonging flavors:

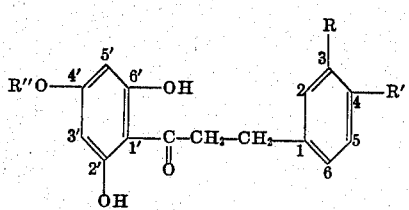

I wherein R represents a radical selected from the group consisting of hydrogen and hydroxy; R' represents a radical selected from the group consisting of hydroxy and 1 to 3 carbon alkoxy; and R'' represents a glycoside residue selected from the group consisting of neohesperidosyl and β-D-glucosyl; and the non-toxic, mono-salts thereof.

The particularly preferred dihydrochalcone derivatives used in the method of the invention are neohesperidin dihydrochalcone and naringin dihydrochalcone, which have the following structures:

Neohesperidin Dihydrochalcone:

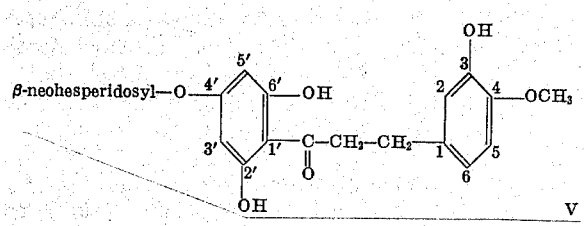

V

Naringin Dihydrochalcone:

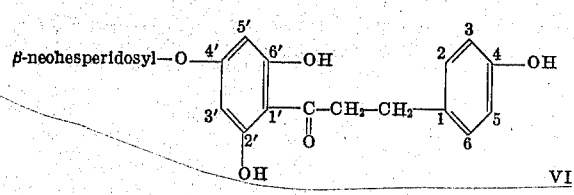

VI

In the practice of this invention, preservation and prolongation of essential oil flavors in gum and candy compositions may be achieved by using a single dihydrochalcone or salt thereof, or a mixture of two or more dihydrochalcone preservatives. The quantity of dihydrochalcone compound or salt thereof which is used to preserve flavoring is variable. In general, however, at least about 0.0025 percent by weight of the dihydrochalcone compound, mixture or salt(s) thereof, based on the weight of the total flavored formulation, should be present to achieve preservation of flavor. Obviously, substantially greater quantities can be employed, if desired or if necessary to produce a particular effect. In general, however, rarely will be necessary to incorporate into the formulation more than 0.5 percent by weight of the dihydrochalcone compound, mixture or salt(s) thereof. Thus, in its broadest embodiment, a flavor-stabilized composition of the invention will contain from about 0.0025 percent to about 0.5 percent by weight of the dihydrochalcone preservative ingredient. Certain of the preferred products will contain from about 0.01 percent to about 0.15 percent by weight of the dihydrochalcone preservative ingredient.

A particularly preferred product contains, as the preservative, a combination of neohesperidin dihydrochalcone and naringin dihydrochalcone. While the ratio of one dihydrochalcone to the other in such combination is within the entire range, combinations containing the following amounts, in percent by weight based on the weight of a total flavored formulation, have been found to be particularly useful:

| Neohesperidin Dihydrochalcone | Naringin Dihydrochalcone | Total In Combination |
|---|---|---|
| 0.0025% – 0.1125% | 0.0025% – 0.0375% | 0.005% – 0.15 |

Essential oil flavoring materials used in chewing gum compositions and candy products which are preserved and/or prolonged by the addition of the dihydrochalcone preservatives of this invention include those volatile oils having a characteristic odor which are distilled from plants, leaves, flowers, etc. Representative flavor oils of this type include citrus and mint oils such as lemon oil, orange oil, lime oil, grapefruit oil; fruit essences such as apple essence, pear essence, peach essence, strawberry essence, apricot essence, raspberry essence, cherry essence, plum essence, pineapple essence and the like; peppermint oil, spearmint oil, clove oil, bay oil, anise oil, eucalyptus oil, thyme oil, cedarwood oil, cinnamon oil, oil of nutmeg, oil of sage, oil of bitter almonds, cassia oil, teaseed oil, and methylsalicylate (oil of wintergreen). Certain synthetic flavor materials, also subject to deterioration, may be preserved through the use of the dihydrochalcone preservatives of the instant invention, in much the same manner as the natural flavoring materials are modified.

Among the above mentioned flavor oils, those which have been found to be particularly benefited by combination with the dihydrochalcone preservatives of this invention include peppermint oil, orange oil, lemon oil, and grapefruit oil. Problems with the development of off-flavors in peppermint are most severe. For this reason, products flavored with peppermint to which the dihydrochalcone preservatives of this invention have been added show exceptionally superior storage life and high quality of flavor.

The candy products to which the dihydrochalcone preserving agents of this invention may be added to modify the effects of deterioration of flavor ingredients include the compressed or pressed candy varieties. These are prepared by mixing sugar, water, and corn syrup to form a wet granulation. Colorants and active ingredients unaffected by temperatures used in subsequent drying procedures may be added at this point. The mass is then dried and screened to an appropriate particle size. Variations of this granulation procedure may be used to form the premix to which flavor(s) and a tablet lubricant, such as magnesium stearate, are added. This final mixture is introduced into a tablet machine to form the compressed candy. A typical pressed candy formula contains the following ingredients, in percent by weight, based on the weight of the total formulation:

| | | | |
|---|---|---|---|
| 75% | to | 98% | sugar |
| 1% | to | 20% | corn syrup |
| .1% | to | 1% | flavor oil |
| 0% | to | .03% | colorant(s) |
| .1% | to | 5% | tableting lubricant |
| .2% | to | 2% | water |

Sugarless pressed candy may also be formulated to include the dihydrochalcone preserving agents of this invention. For products of this type, which usually contain powdered sorbitol instead of sugar, synthetic sweeteners are mixed with the powdered sorbitol and flavor(s), colorant(s) and a tablet lubricant are then added. The formula is introduced into a tablet machine to shape the final product. A typical sugarless pressed candy contains the following ingredients, in percent by weight, based on the weight of the total formulation:

| | | | |
|---|---|---|---|
| 98% | to | 99.5% | sorbitol |
| .1% | to | .9% | flavor(s) |
| 0% | to | .02% | synthetic sweeteners |
| 0% | to | .03% | colorant(s) |
| .05% | to | 1.% | tableting lubricant |

Obviously, many variations of the above described procedures may be used to prepare pressed candies. Whichever procedure is used, according to the method of this invention, the dihydrochalcone preservative is added to the formulation in order to modify deterioration of flavor quality.

The dihydrochalcone preserving agents of the present invention are particularly effective in chewing gum compositions, since they not only preserve flavor quality, but also prolong the life of the flavor throughout the chewing of the gum.

While substantial variations therein are possible, a typical chewing gum may contain the following ingredients, in percent by weight based on the weight of the total gum formulation:

| Ingredients | Weight Percent |
|---|---|
| gum base | from about 10% to about 40% |
| sucrose | from about 50% to about 75% |
| corn syrup or glucose | from about 10% to about 20% |
| flavor material | from about 0.4% to about 5% |

An alternate chewing gum formulation is as follows:

| Ingredients | Weight Percent |
|---|---|
| gum base | from about 10% to about 50% |
| binder | from about 3% to about 20% |
| filler (sorbitol, mannitol or combinations thereof) | from about 5% to about 80% |
| artificial sweetener and flavor | from about 0.1% to about 5% |

In certain sugarless gums, there is used as the binder ingredient, a solution of sorbitol in water containing from about 10 percent to about 80 percent, preferably from about 60 percent to about 75 percent by weight of sorbitol in water. In others there is used a gum acacia-in-water system containing from about 30 percent to about 60 percent, preferably from about 45 percent to about 50 percent, by weight of gum acacia powder.

The above chewing gum formulations are exemplary only. Many additional formulations are described in the prior art and, in carrying out this invention, such formulations can be employed. It is also possible to prepare an acceptable chewing gum product containing a gum base, flavoring material and at least one dihydrochalcone preservative according to the teaching of this invention.

The ingredient, referred to heretofore in the formulations simply as "gum base" is susceptible to many variations. In general, a gum base is prepared by heating and blending various ingredients, such as, natural gums, synthetic resins, waxes, plasticizers, etc., in a manner well known in the art. Typical examples of the ingredients found in a chewing gum base are masticatory substances of vegetable origin, such as chicle, crown gum, nispero, rosidinha, jelutong, pendare, perillo, niger gutta, tunu, etc.; masticatory substances of synthetic origin, such as, butadiene-styrene polymer, isobutylene-isoprene copolymer, paraffin, petroleum wax, polyethylene, polyisobutylene, polyvinylacetate, etc.; plasticizers, such as, lanolin, stearic acid, sodium stearate, potassium stearate, etc.; antioxidants, such as, butylated hydroxyanisole, butylated hydroxytoluene, and propyl gallate.

The manner in which the dihydrochalcone flavor preserving agents are incorporated into the chewing gum composition or candy products is not critical and will be readily apparent to persons skilled in the art. For candy products, the dihydrochalcone preserving agents are preferably added along with the flavor(s) during formulating. For chewing gum compositions, a variety of procedures may be followed. For example, the dihydrochalcone or the mixture of dihydrochalcones can be added to, and blended in, the chewing gum base prior to the admixture of the base with the other ingredients in the formulation. In the alternative, the dihydrochalcone or dihydrochalcone mixture can be dissolved in a suitable solvent, for example, water, aqueous ethyl alcohol or those flavors which are suitable as solvents for the dihydrochalcone preservatives. The solution, thus obtained, is blended with the remaining ingredients of the chewing gum formulation. If desired, the flavor component can be added to the solvent solution of the dihydrochalcone prior to the formulation of that solution with the other chewing gum ingredients. The preferred procedure is to dissolve the dihydrochalcone component, or the mixture of dihydrochalcone components, in aqueous alcohol prior to use. The quantity of solvent used in producing the solution is not critical, the objectives of the invention being achieved by the use of an amount of solvent sufficient to dissolve the dihydrochalcone compound.

The present invention provides a significant advance in the art. It furnishes an efficient and practical method for preserving essential oil flavor(s) in chewing gum compositions and candy products and makes possible storage of such products for periods of time heretofore impossible.

A further advantage of the dihydrachalcone preserving agents of this invention is that, in some cases, it has been found possible to employ essential oils of a cruder cut (i.e., those which have not been subjected to repeated purification processes) to obtain products having superior flavors. Without the addition of the dihydrochalcone preserving agents to products flavored with a crude cut of essential oils, flavor quality is low and off-flavors develop rapidly.

The mechanism by which the dihydrochalcones perform this preservative function is not entirely understood. Certainly, the prior art does not suggest that such activity could be expected: Inglett, E. G., et al., in Journal of Food Science, Vol. 34: 101–103 (1969), attribute sweetening properties to certain dihydrochalcones. In fact, some compounds have been reported to be intensely sweet, making them potentially valuable as synthetic sweeteners. Combinations of the dihydrochalcones with commercially used synthetic sweeteners have been found to impart good taste qualities in soft drink products. However, synergism does not appear to be a factor, according to the results obtained in these prior art studies. Nor do prior art investigations indicate or suggest the possibility of prolonging flavor quality in chewing gum compositions by the use of dihydrochalcone sweeteners.

Thus, it is totally unexpected that dihydrochalcone compounds, their salts and mixtures thereof, are able to modify the deterioration of essential oil flavor ingredients in candy and gum products, and in addition, to prolong flavor in gum throughout its normal "chewing life."

For a fuller understanding of the nature and objects of this invention, reference may be had to the following examples which are given merely as further illustration of the invention and are not to be construed in a limiting sense.

EXAMPLE 1

Gum Composition Containing Neohesperidin Dihydrochalcone, Flavored With Oil Of Peppermint.

A gum composition is prepared containing the following ingredients in the quantities specified: Gum base 20 grams; Corn syrup 19 grams; Sucrose 59.55 grams; Neohesperidin dibydrochalcone 0.1 grams; Ethyl alcohol 0.35 grams; and Oil of peppermint 1. grams.

In producing the composition, neohesperidin dihydrochalcone is dissolved in the ethyl alcohol and mixed with the oil of peppermint. This mixture is added to the gum bath containing the gum base, sucrose, and corn syrup, and thoroughly mixed. The gum product is then rolled, scored, conditioned and wrapped in the usual manner.

EXAMPLE 2

Gum Composition Containing the Monocalcium Salt of Neohesperidin Dihydrochalcone, Flavored With Oil Of Peppermint.

A gum composition is prepared as in Example 1, using 0.04 grams of the calcium salt of neohesperidin dihydrochalcone, dissolved in 0.41 grams of water in place of the ethyl alcohol; this solution is added to 1 gram of oil of peppermint and the mixture obtained is added to the gum batch according to the method described in Example 1 and further processed as described in Example 1.

EXAMPLE 3

Gum Composition Containing Naringin Dihydrochalcone, Flavored With Oil of Peppermint.

A chewing gum is prepared as in Example 1 using 0.1 gram of naringin dihydrochalcone dissolved in 0.35 grams of ethyl alcohol; the solution is mixed with 1. gram of oil of peppermint and the mixture obtained is added to a gum batch prepared according to the method described in Example 1 and further processed as described in Example 1.

EXAMPLE 4

Gum Composition Containing Neohesperidin Dihydrochalcone, Flavored With Oil Of Spearmint A chewing gum composition is prepared as in Example 1 using 0.075 grams of neohesperidin dihydrochalcone and 0.025 grams of naringin dihydrochalcone dissolved in 0.35 grams of ethyl alcohol; the solution is mixed with 1. gram of oil of spearmint and the mixture obtained is added to a gum batch according to the method described in Example 1 and further processed as described in Example 1.

EXAMPLE 5

Gum Composition Containing Neohesperidin Dihydrochalcone Flavored With Oil of Lemon.

A gum batch is prepared as in Example 1, using 0.075 grams of neohesperidin dihydrochalcone and 0.025 grams of naringin dihydrochalcone dissolved in 0.35 grams of ethyl alcohol; the solution obtained is blended with 1 gram of oil of lemon. The mixture obtained is added to the gum batch according to the method described in Example 1 and further processed as described in Example 1.

EXAMPLE 6

Sugarless Gum Composition Containing The Monocalcium Salt Of Neohesperidin Dihydrochalcone, Flavored With Oil Of Peppermint.

A gum composition is prepared containing the following ingredients in the quantities specified: Gum base 28 grams; Gum acacia solution (45 percent aqueous) 6 grams; Gum acacia powder 3 grams; Mannitol 26 grams; Sorbitol 35.55 grams; the monocalcium salt of Neohesperidin dihydrochalcone 0.04 grams; water 0.41 grams; and Oil of Peppermint 1 gram.

In preparing this composition, the gum acacia-in-water is blended with the gum base and the sorbitol ingredient is then added and mixed to obtain a uniform blend. Next, the gum acacia powder and mannitol ingredients are added and mixed into the blend. The monocalcium salt of neohesperidin dihydrochalcone is dissolved in the water, mixed with the oil of peppermint and then incorporated into the blend and thoroughly mixed. The gum product is then rolled, scored, conditioned and wrapped in the usual manner.

EXAMPLE 7

Pressed Candy Composition Containing Neohesperidin Dihydrochalcone And Naringin Dihydrochalcone, Flavored With Oil of Peppermint.

A pressed candy composition is prepared containing the following ingredients in the quantities specified: Sugar 94 grams; Corn Syrup 3.6 grams; Water 1.4 grams; Oil of peppermint .30 grams; Neohesperidin dihydrochalcone 0.005 grams; Naringin dihydrochalcone 0.005 grams; Ethyl alcohol 0.44 grams; and Magnesium Stearate 0.25 grams.

The sugar, corn syrup, and water are mixed together in a mixing kettle, then passed through an extruder onto drying trays. The trays are dried in an oven at a temperature of 140°F. The dried granulation obtained is forced through a 30 mesh screen. The 30 mesh granulation obtained is added to a mixing kettle. The neohesperidin dihydrachalcone and the naringin dihydrochalcone are dissolved in ethyl alcohol and this solution is added to the oil of peppermint; this mixture is added to the mixing kettle containing the other ingredients and all are mixed thoroughly. The magnesium stearate is added and blended in thoroughly. This final blend is pressed into tablets in the usual manner.

EXAMPLE 8

Pressed Candy Containing Neohesperidin Dihydrochalcone and Naringin Dihydrochalcone Flavored With Essence of Cherry.

A pressed candy composition is prepared as in Example 7, using 0.005 grams of neohesperidin dihydrochalcone and 0.005 grams of naringin dihydrochalcone dissolved in 0.54 grams of ethyl alcohol; this solution is added to 0.2 grams of imitation cherry flavor essence and the mixture obtained is added to the candy composition according to the method described in Example 7 and further processed as described in Example 7.

EXAMPLE 9

Pressed Candy Containing the Monocalcium Salt of Neohesperidin Dihydrochalcone, Flavored With Oil of Peppermint.

A pressed candy composition is prepared as in Example 7, using 0.01 grams of the calcium salt of neohesperidin dihydrochalcone dissolved in 0.2 grams of the water (in place of the ethyl alcohol); this solution is mixed with 0.3 grams of oil of peppermint and added to a candy composition according to the method described in Example 7 and further processed as described in Example 7.

EXAMPLE 10

Pressed Candy Composition Containing Prunin Dihydrochalcone, Flavored With Oil of Lemon.

A pressed candy composition is prepared as described in Example 7 using 0.01 grams of prunin dihydrochalcone dissolved in 0.44 grams of ethyl alcohol; this solution is added to 0.3 grams of oil of lemon and the mixture obtained is added to the candy composition according to the method described in Example 7 and further processed as in Example 7.

A significant improvement in the storage life of the above products, particularly with respect to flavor quality, is obtained when compared with control products without the dihydrochalcone ingredient. Stability of flavors in the products of Examples 1,2,3,6,7, and 9, in which oil of peppermint was used, was particularly impressive when compared with products in which the dihydrochalcone preservative was omitted. In addition, the chewing gum products described in Examples 1–6 exhibited a duration of flavor during chewing that was greatly enhanced and prolonged as compared to comparable products containing no dihydrochalcone.

We claim:

1. In a method for preserving and prolonging natural and synthetic essential oil flavors in chewing gum containing from about 50 percent to about 75 percent by weight of sucrose, based on the weight of the total formulation, and from about 0.4 percent to about 5.0 percent by weight of natural or synthetic essential oil flavor, the improvement of incorporating therein at least about 0.0025 percent by weight of at least one dihydrochalcone flavor preserving and prolonging agent having the formula:

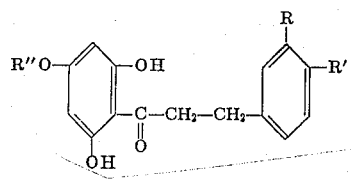

wherein R represents a radical selected from the group consisting of hydrogen and hydroxy; R' represents a radical selected from the group consisting of hydrogen, hydroxy and 1 to 3 carbon alkoxy; and R" represents a radical selected from the group consisting of $\beta$-rutinosyl, neohesperidosyl and $\beta$-D-glucosyl; and the nontoxic, alkali metal and alkaline earth metal, monobasic salts thereof.

2. A method according to claim 1 wherein R represents a radical selected from the group consisting of hydrogen and hydroxy; R' represents a radical selected from the group consisting of hydroxy and 1 to 3 carbon alkoxy; and R" represents a radical selected from the group consisting of $\beta$-neohesperidosyl and $\beta$-D-glucosyl; and the nontoxic, alkali metal and alkaline earth metal, mono-basic salts thereof.

3. A method according to claim 1 wherein from about 0.0025 percent by weight to about 0.5 percent by weight of at least one dihydrochalcone preservative is present.

4. A method according to claim 1 wherein from about 0.01 percent by weight to about 0.15 percent by weight of at least one dihydrochalcone preservative is present.

5. A method according to claim 1 wherein the dihydrochalcone preservative is the monocalcium salt of neohesperidin dihydrochalcone.

6. A method according to claim 1 wherein the dihydrochalcone preservative is naringin dihydrochalcone.

7. A method according to claim 1 wherein the dihydrochalcone preservative is prunin dihydrochalcone.

8. A method according to claim 1 wherein the dihydrochalcone preservative is hesperetin dihydrochalcone glucoside.

9. A method according to claim 2 wherein the dihydrochalcone preservative is neohesperidin dihydrochalcone.

10. A method according to claim 2 wherein the dihydrochalcone preservative is naringin dihydrochalcone.

11. A method according to claim 2, wherein oil of peppermint flavor in chewing gum compositions containing from about 10 percent to about 40 percent by weight of gum base is preserved by incorporating therein a combination of from about 0.0025 percent to about 0.1125 percent by weight of neohesperidin dihydrochalcone and from about 0.0025 percent to about 0.0375 percent by weight of naringin dihydrochalcone.

12. A method according to claim 2 wherein the oil of peppermint flavor in chewing gum compositions is preserved by incorporating therein from about 0.01 percent to about 0.15 percent by weight of the monocalcium salt of neohesperidin dihydrochalcone.

13. In a method for preserving natural and synthetic essential oil flavors in chewing gum containing from about 50 percent to about 75 percent by weight of sucrose, based on the weight of the total formulation, and from about 0.4 percent to about 5.0 percent by weight of natural or synthetic essential oil flavor, the improvement of incorporating therein at least 0.0025 percent by weight of 2',4,6'-trihydroxy-3-methoxy-4'-neohesperidosyloxydihydrochalcone.

14. A chewing gum having preserved and prolonged flavor qualities comprising:
   a. from about 50 percent to about 75 percent by weight, based on the total weight of the formulation, of sucrose;
   b. from about 0.4 percent to about 5.0 percent by weight of a natural or synthetic essential oil flavor; and
   c. at least about 0.0025 percent by weight of at least one dihydrochalcone flavor preserving and prolonging agent having the formula:

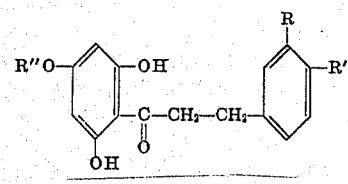

wherein R represents a radical selected from the group consisting of hydrogen and hydroxy; R' represents a radical selected from the group consisting of hydrogen, hydroxy and 1 to 3 carbon alkoxy; and R'' represents a radical selected from the group consisting of β-rutinosyl, neohesperidosyl and β-D-glucosyl; and the nontoxic, alkali metal and alkaline earth metal, monobasic salts thereof.

15. A composition according to claim 14 wherein from about 0.0025 percent by weight to about 0.5 percent by weight of at least one dihydrochalcone preservative is present.

16. A composition according to claim 14 wherein from about 0.01 percent by weight to about 0.15 percent by weight of at least one dihydrochalcone preservative is present.

17. A composition according to claim 15 wherein the preservative is the monocalcium salt of naringin dihydrochalcone.

18. A composition according to claim 15 wherein the preservative is the monocalcium salt of neohesperidin dihydrochalcone.

19. A composition according to claim 15 wherein the preservative is a combination of from about 0.0025 percent to about 0.1125 percent by weight of neohesperidin dihydrochalcone and from about 0.0025 percent to about 0.0375 percent by weight of naringin dihydrochalcone.

20. A chewing gum having preserved and prolonged flavor qualities comprising:

a. from about 50 percent to about 75 percent by weight of sucrose;
b. from about 0.4 percent to about 5.0 percent by weight of a natural or synthetic essential oil flavor; and
c. at least about 0.0025 percent by weight of 2',4,6'-trihydroxy-3-methoxy-4'-neohesperidosyloxydihydrochalcone.

21. In a method for preserving natural and synthetic essential oil flavors in candy compositions containing from about 75 percent to about 98 percent by weight of sucrose, based on the total weight of the formulation, and from about 0.1 percent to about 1.0 percent by weight of natural or synthetic essential oil flavor, the improvement of incorporating therein at least about 0.0025 percent by weight of at least one dihydrochalcone flavor preserving agent having the formula:

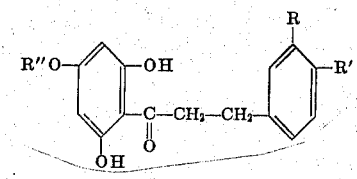

wherein R represents a radical selected from the group consisting of hydrogen and hydroxy; R' represents a radical selected from the group consisting of hydrogen, hydroxy and 1 to 3 carbon alkoxy; and R'' represents a radical selected from the group consisting of β-rutinosyl, neohesperidosyl and β-D-glucosyl; and the nontoxic, alkali metal and alkaline earth metal, monobasic salts thereof.

22. A method according to claim 21 wherein, in the dihydrochalcone flavor preserving agent, R represents a radical selected from the group consisting of hydrogen and hydroxy; R' represents a radical selected from the group consisting of hydroxy and 1 to 3 carbon alkoxy; and R'' represents a radical selected from the group consisting of β-neohesperidosyl and β-D-glucosyl; and the nontoxic, alkali metal and alkaline earth metal, mono-basic salts thereof.

23. A method according to claim 21 wherein from about 0.0025 percent by weight to about 0.5 percent by weight of at least one dihydrochalcone preservative is present.

24. A method according to claim 21 wherein from about 0.01 percent by weight to about 0.15 percent by weight of at least one dihydrochalcone preservative is present.

25. A method according to claim 21 wherein the dihydrochalcone preservative is the monocalcium salt of neohesperidin dihydrochalcone.

26. A method according to claim 21 wherein the dihydrochalcone preservative is naringin dihydrochalcone.

27. A method according to claim 21 wherein the dihydrochalcone preservative is prunin dihydrochalcone.

28. A method according to claim 21 wherein the dihydrochalcone preservative is hesperetin dihydrochalcone glucoside.

29. A method according to claim 22 wherein the dihydrochalcone preservative is neohesperidin dihydrochalcone.

30. A method according to claim 22 wherein the dihydrochalcone preservative is naringin dihydrochalcone.

31. A method according to claim 22, wherein oil of peppermint flavor in candy compositions is preserved by incorporating therein a combination of from about 0.0025 percent to about 0.1125 percent by weight of neohesperidin dihydrochalcone and from about 0.0025 percent to about 0.0375 percent by weight of naringin dihydrochalcone.

32. A method according to claim 22 wherein the oil of peppermint flavor in candy compositions is preserved by incorporating therein from about 0.01 percent to about 0.15 percent by weight of the monocalcium salt of neohesperidin dihydrochalcone.

33. In a method for preserving natural and synthetic essential oil flavors in candy compositions containing from about 75 percent to about 98 percent by weight of sucrose, based on the total weight of the formulation, and from about 0.1 percent to about 1.0 percent by weight of natural or synthetic essential oil flavor, the improvement of incorporating therein at least about 0.0025 percent by weight of 2',4,6'-trihydroxy-3-methoxy-4'-neohesperidosyloxydihydrochalcone.

34. A candy composition having preserved flavor qualities, comprising:
   a. from about 75 percent to about 98 percent by weight of sucrose, based on the total weight of the formulation;
   b. from about 0.1 percent to about 1.0 percent by weight, of a natural or synthetic essential oil flavor; and
   c. at least about 0.0025 percent of at least one dihydrochalcone flavor preserving agent having the formula:

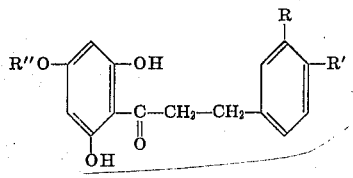

wherein R represents a radical selected from the group consisting of hydrogen and hydroxy; R' represents a radical selected from the group consisting of hydrogen, hydroxy and 1 to 3 carbon alkoxy; and R'' represents a radical selected from the group consisting of $\beta$-rutinosyl, neohesperidosyl and $\beta$-D-glucosyl; and the nontoxic, alkali metal and alkaline earth metal, monobasic salts thereof.

35. A composition according to claim 34 wherein from about 0.0025 percent by weight to about 0.5 percent by weight of at least one dihydrochalcone preservative is present.

36. A composition according to claim 34 wherein from about 0.01 percent by weight to about 0.15 percent by weight of at least one dihydrochalcone preservative is present.

37. A composition according to claim 35 wherein the preservative is the monocalcium salt of naringin dihydrochalcone.

38. A composition according to claim 35 wherein the preservative is the monocalcium salt of neohesperidin dihydrochalcone.

39. A composition according to claim 35 wherein the preservative is a combination of from about 0.0025 percent to about 0.1125 percent by weight of neohesperidin dihydrochalcone and from about 0.0025 percent to about 0.0375 percent by weight of naringin dihydrochalcone.

40. A candy composition having preserved flavor qualities, comprising:
   a. from about 75 percent to about 90 percent by weight of sucrose, based on the total weight of the formulation;
   b. from about 0.1 percent to about 1.0 percent by weight of a natural or synthetic essential oil flavor; and
   c. at least 0.0025 percent by weight of 2',4,6'-trihydroxy-3-methoxy-4'-neohesperidosyloxydihydrochalcone.

* * * * *